(12) United States Patent
Dicke

(10) Patent No.: US 10,056,831 B2
(45) Date of Patent: Aug. 21, 2018

(54) FILTER AND METHOD FOR DIRECT RECTIFICATION GRID-POWERED POWER SUPPLIES

(71) Applicant: Treehouse Design, Inc., Colorado Springs, CO (US)

(72) Inventor: Curtis J. Dicke, Colorado Springs, CO (US)

(73) Assignee: Treehouse Design, Inc., Colorado Springs, CO (US)

( * ) Notice: Subject to any disclaimer, the term of this patent is extended or adjusted under 35 U.S.C. 154(b) by 0 days.

(21) Appl. No.: 15/405,034

(22) Filed: Jan. 12, 2017

(65) Prior Publication Data

US 2017/0201173 A1 Jul. 13, 2017

Related U.S. Application Data

(60) Provisional application No. 62/277,773, filed on Jan. 12, 2016.

(51) Int. Cl.
*H02M 1/14* (2006.01)
*H02M 7/217* (2006.01)
*H02M 3/156* (2006.01)

(52) U.S. Cl.
CPC .............. *H02M 3/156* (2013.01); *H02M 1/14* (2013.01); *H02M 7/217* (2013.01)

(58) Field of Classification Search
CPC .......... H02M 7/06; H02M 7/21; H02M 7/217; H02M 2001/0022; H02M 1/126; H02M 1/14; H02M 1/15
See application file for complete search history.

(56) References Cited

U.S. PATENT DOCUMENTS

| | | | | |
|---|---|---|---|---|
| 4,801,887 A * | 1/1989 | Wegener | .................. | G05F 3/18 327/104 |
| 7,529,107 B2 * | 5/2009 | Mehta | .................. | H02H 7/1213 315/226 |
| 7,531,379 B2 * | 5/2009 | Rhodes | ............. | H01L 27/14603 257/448 |
| 7,948,780 B2 * | 5/2011 | Sonobe | .................. | H02M 1/36 363/21.08 |

* cited by examiner

*Primary Examiner* — Gary L Laxton
(74) *Attorney, Agent, or Firm* — Lathrop Gage LLP

(57) ABSTRACT

A high-voltage filter for an alternating-current (AC) to direct current (DC) power adapter of the type having a rectifier providing an internal ground and a high voltage DC, the high voltage DC coupled to drive a DC-DC converter providing a power adapter output, the high voltage filter coupled to filter the high voltage DC, has a first capacitor coupled between the high-voltage DC and an intermediate node. A second capacitor is coupled between the intermediate node and the internal ground. A source follower transistor has a drain coupled to the high-voltage and a source coupled to the intermediate node, with gate coupled to a reference supply. In a particular embodiment, the reference supply has a resistor coupled between the high voltage DC and the gate of the source follower, and at least one zener diode coupled between the gate of the source follower and internal ground.

4 Claims, 3 Drawing Sheets

FILTER AND METHOD FOR DIRECT RECTIFICATION GRID-POWERED POWER SUPPLIES

RELATED APPLICATIONS

The present document claims priority to U.S. Provisional Patent Application 62/277,773 filed 12 Jan. 2016, the contents of which are incorporated herein by reference.

FIELD

The present document relates to the field of Direct-Rectification, Multivoltage, AC-to-DC conversion power supplies and power adapters.

BACKGROUND

Grid-powered AC-to-DC power converters are ubiquitous in the modern home and office. These range from low powered "wall cubes" configured to convert AC from the national electric grid through a wall socket to power cell phones and tablet computers through larger power supplies configured to power notebook and laptop computers, to the larger power supplies of desktop computers and printers.

While single-voltage power supplies, operable over a range of input voltages from 105-135 VAC, may suffice for use in the United States alone, almost all international business travelers, and most leisure travelers, carry with them one or more cell phones, electronic cameras, electric razors, tablet or laptop computers, and other portable electronic devices. Further, many such devices are manufactured for the international market, with only a plug adapter or cord and configured language selections of software differing between versions sold in multiple countries. Since many countries of the Caribbean, Europe, Asia, New Zealand, and Australia distribute grid power in the 200-250 VAC range, it has become traditional to provide multivoltage power supplies with many audio players, cell phones, tablets, and laptop computers, these are typically operable from a low voltage in the 90-100 VAC range to a high voltage in the 240-250 VAC range, and operable at either the 50 or 60 hertz frequency common among US and foreign national power grids. Many of these portable electronic devices have batteries and battery chargers in them and operate internally primarily from low DC voltages between one and twenty-four volts.

Many grid-powered AC-to-DC power converters use direct-rectification of their AC input to provide an internal high-voltage DC bus, with an internal DC-DC downconverter adapted to convert the internal high-voltage DC to a low-voltage DC power-supply output connectable to the portable electronic device. Low voltage DC outputs of 5 volts, 12-14 volts, and 18 volts are particularly common, although other output voltages are known.

Such supplies often have an architecture depicted in FIG. 1. An AC supply couples to a rectifier 102 that provides a pulsating DC current. The rectifier feeds high voltage filter 104, having at least one capacitor, that provides high voltage energy to a regulated DC-DC converter 106, in some embodiments the DC-DC converter is a buck-type converter, although other converter types may be used. In isolated power supplies, the DC-DC converter may incorporate a transformer instead of the simple inductor of a buck-type converter. The DC-DC converter has a second filter 108 that provides DC power to a load (not shown).

In typical power supplies, the high voltage filter has one or more capacitors connected across high voltage DC. This capacitor must have a high voltage rating to prevent failure since the high voltage is essentially equal to the peak voltage input to the system; nominal voltage at the capacitor may reach 350 volts when the adapter is operated from 250 VAC in Europe. Unfortunately, 350 volt capacitors are expensive and can be leaky compared to lower-voltage capacitors.

SUMMARY

In an embodiment, a high-voltage filter for an alternating-current (AC) to direct current (DC) power adapter of the type having a rectifier providing an internal ground and a high voltage DC, the high voltage DC coupled to drive a DC-DC converter providing a power adapter output, the high voltage filter coupled to filter the high voltage DC, has a first capacitor coupled between the high-voltage DC and an intermediate node. A second capacitor is coupled between the intermediate node and the internal ground. A source follower transistor has a drain coupled to the high-voltage and a source coupled to the intermediate node, with gate coupled to a reference supply.

In another embodiment a method of converting alternating current (AC) to an output regulated direct current (DC) includes rectifying the AC to provide a high voltage DC and an internal ground; using a source follower to derive an intermediate voltage from the high voltage DC, a gate of the source follower being coupled to a reference supply; filtering the high voltage DC using at least a first capacitor coupled between the high voltage DC and the intermediate voltage, and a second capacitor coupled between the intermediate voltage and the internal ground; and providing the high voltage DC to a regulated DC-DC converter coupled to provide the output regulated DC.

DETAILED DESCRIPTION OF THE EMBODIMENTS

Figure 1:
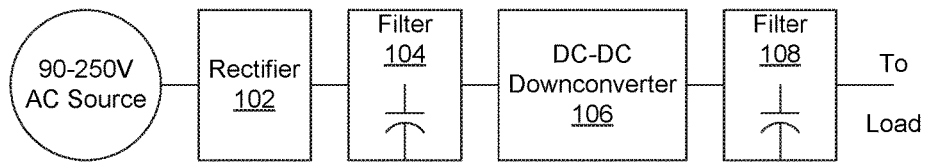
FIG. 1 is a block diagram of a typical PRIOR-ART direct-rectification, multivoltage, AC-DC power supply.
Figure 2:
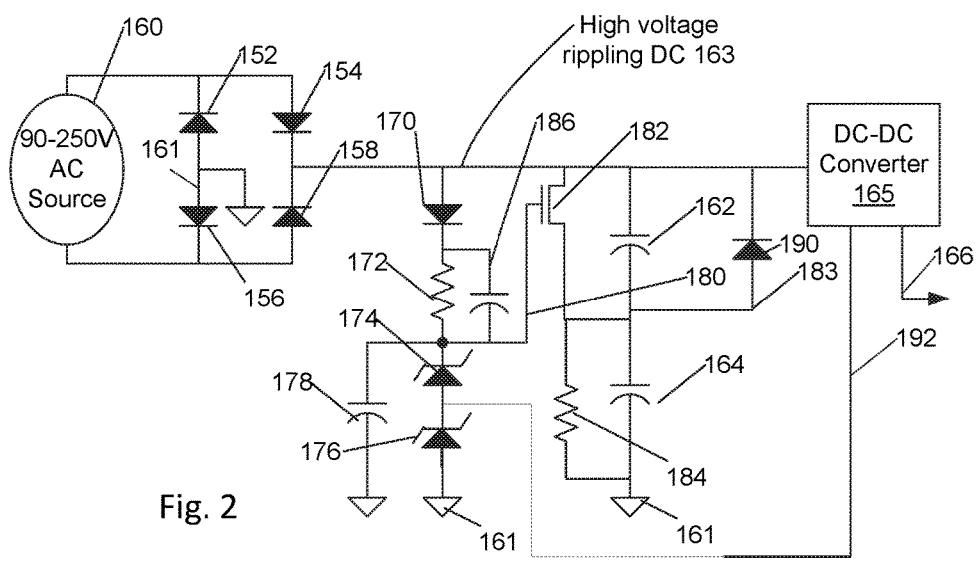
FIG. 2 is a schematic diagram of the rectifier and high voltage filter of an embodiment of a direct rectification multivoltage AC-DC power supply.

A full-wave bridge rectifier is formed of diodes 152, 154, 156, 158. This rectifier is coupled to receive power from an alternating current (AC) source 160 and provides a high voltage, rippling, DC to DC power bus 163 relative to an internal ground 161. The rectifier feeds power directly to an upper filter capacitor 162, filter capacitor 162 is coupled in series with a second, lower, filter capacitor 164 to internal ground 161. The two filter capacitors 162, 163 act together as an energy storage capacitor to filter an AC component from the rectifier output and high voltage DC power bus 163. High voltage DC power bus 163 is coupled to provide high voltage DC power to a DC-DC converter 165, and thence to a load, not shown. In filtering high voltage DC power bus 163, capacitors 162, 163 store sufficient energy that DC-DC converter 165 can remain in operation through full cycles of AC source 160 thereby ensuring that the load does not see power interruptions.

The AC supply is variable between 90 and 250 VAC, which implies that the high voltage DC power bus 163 is exposed to a DC voltage in the range of 125 to 350 volts absent any surges. For purposes of this document, the AC supply is presumed sinusoidal, and voltages are measured root-mean-square (RMS) as traditionally used when measuring AC voltages.

When capacitors are coupled in series, traditionally an AC voltage across them divides roughly as the ratio of the capacitances of the capacitors, as does an initial surge as a DC component is connected. Longer term, a DC component across capacitors divides according to a leakage of the capacitors unless additional components, such as bypass resistors, are provided to balance this voltage.

In the present system, capacitors 162 and 164 are individually not rated to handle a full 350 volts; however a sum of the voltage rating of the two capacitors is greater than 350 volts. It is therefore important that the inter-node voltage 183 between the capacitors never exceed a voltage rating of the lower capacitor 164, and that when the power supply is first connected to AC power source 160 the inter-node voltage 183 rises quick enough that a voltage across the upper capacitor 162 does not exceed a voltage rating of the upper capacitor 162. Note that charging surge currents are limited by resistance of the bridge rectifier diodes 152, 154, 156, and 158.

High voltage DC power bus 163 is coupled through a diode 170 and resistor 172 to a high-voltage Zener diode, in an embodiment the high-voltage Zener diode is a series assembly of multiple lower-voltage Zener diodes 174, 176, in an embodiment the sum of low voltage Zener diode knee voltages is between 135 and 220 volts, and in a particular embodiment 175 volts, forming a small, low-current, Zener-regulated, reference power supply that under some operating conditions provides a voltage at about the Zener knee voltage to provide low-current regulated voltage 180. A small-value, inexpensive, filter capacitor 178 is provided to filter AC at the low-current regulated voltage 180.

Low-current regulated voltage 180 is applied to a gate of a high-voltage N-channel field-effect transistor 182 that in an embodiment is an LDMOS transistor. Transistor 182 is coupled as a source-follower that drives the inter-node voltage 183 between capacitors 162, 164 to a voltage near the low-current regulated voltage 180. A diode 190, which in an embodiment is a parasitic diode of transistor 182, is coupled between inter-node voltage 186 and high voltage DC power bus 163.

In particular embodiments where leakage of capacitor 164 might not be enough to prevent inter-node voltage 183 from exceeding a voltage rating of capacitor 164, a high-value bleed resistor 184 is provided to drain charge from capacitor 164. In order to expedite risetime of low-current regulated voltage 180 and inter-node voltage 183 when connection to AC source 160 occurs near a peak of an AC cycle, in some embodiments a speedup capacitor 186 is provided to charge-share onto regulated voltage 180 node.

In particular embodiments, upper capacitor 162 may be significantly smaller than lower capacitor 164.

In some embodiments, where multiple lower-voltage Zener diodes 174, 176 are provided in place of a single higher-voltage Zener diode, a reference voltage 192 may be tapped from between zener diodes 174, 176 and provided as an additional reference voltage, such as a reference to the DC-DC converter 165.

Operation of the Circuit.

Figure 3:
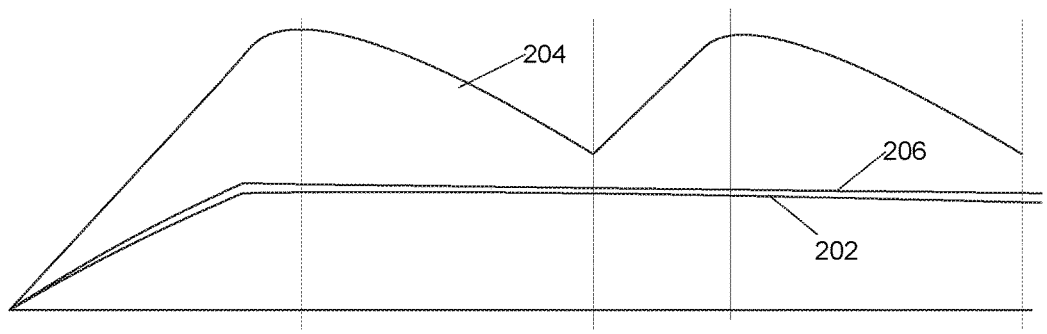
FIG. 3 is a waveform of certain nodes in the filter at high voltage.

In operation at high AC voltages, after the rectifier is coupled to AC source 160, low-current regulated voltage 180, 206 rises to a level determined by the Zener voltage of Zener diodes 174, 176, and remains stable at that level thereafter. inter-node voltage 183, 202 remains fairly stable as illustrated in FIG. 3, at essentially a threshold voltage of transistor 182 below high voltage DC power bus 163, 204 while high voltage DC power 163 204 provided to the DC-DC converter 165 has considerable ripple as upper capacitor 162 provides power to DC-DC converter 165. The fairly high ripple on high voltage DC power bus 163, 204 remains, however, within the dynamic range of DC-DC converter 165, so a regulated DC output 166 of DC-DC converter 165 has little ripple.

Figure 4:
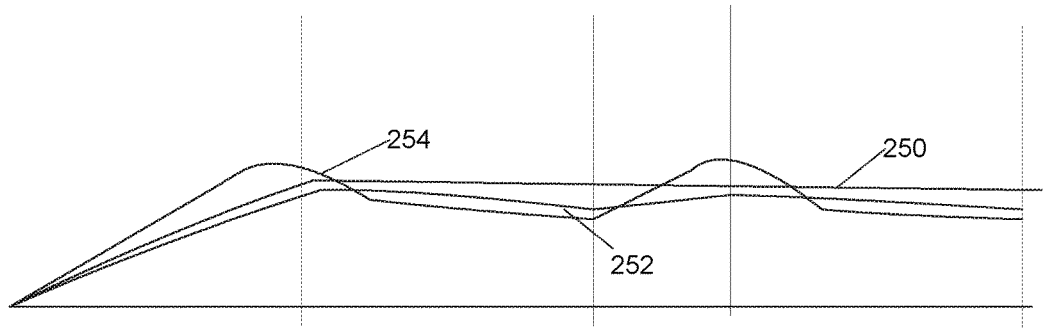
FIG. 4 is a waveform of certain nodes in the filter at lower voltage than FIG. 3.
Figure 5:
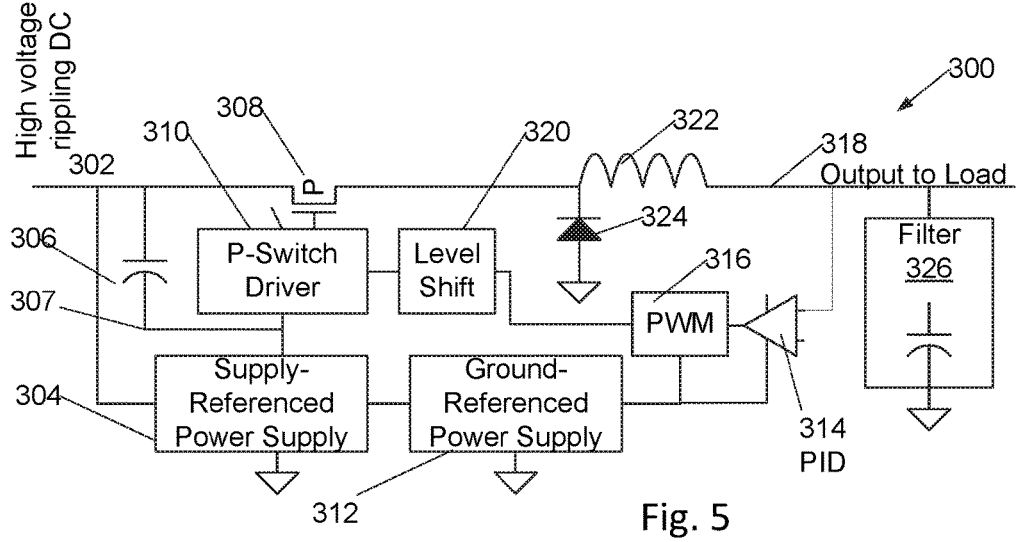
FIG. 5 is a block diagram of the DC-DC converter of an embodiment of a direct rectification multivoltage AC-DC power supply.

At lower low AC voltages, after the rectifier is coupled to an AC source 160, low-current regulated voltage 180, 250, (FIG. 4) rises initially to a level determined as a diode drop of diode 170 below high voltage DC 163, 254 while high voltage DC 163, 254 rises to a level a diode drop below a peak voltage of the AC voltage source 160. Similarly, inter-node voltage 183, 252, rises to a level approximately a transistor threshold voltage of transistor 182 below regulated voltage 180, 250; in most cases about a volt below regulated voltage 180, 250. After a peak of the AC source 160 subsides, high voltage DC 163, 254 subsides as power is drawn by DC-DC converter 165 from upper capacitor 162, until it drops below a turn-on voltage of parasitic diode 190, at which time high voltage DC power bus 163 draws current through diode 190 from lower capacitor 164. Since lower capacitor 164 is larger than upper capacitor 162, ripple on high voltage DC power bus 163, 254 is less than that of the high voltage case of FIG. 3, and remains within the dynamic range of DC-DC converter 165, so a regulated DC output 166 of DC-DC converter 165 continues to have little ripple.

In a particular embodiment, upper capacitor 162 is a ceramic capacitor, and lower capacitor 164 is an electrolytic capacitor. In a particular embodiment, capacitor 162 has capacitance ranging from one half to one twentieth that of capacitor 164, and in a particular embodiment has capacitance one fifth of that of capacitor 164. For purposes of this document, upper capacitor 162 and lower capacitor 164 have significantly different values if the capacitance of upper capacitor 162 is less than or equal to half the capacitance of lower capacitor 164.

In a particular embodiment, the converter herein described is operable through a 105-125 (115 nominal) voltage range, and through a 200-240 (220 nominal) voltage range, and the high voltage Zener diode has a Zener voltage between 150 and 200 volts.

In a particular embodiment, the AC-DC converter herein described includes a DC-DC converter 165, 300 as detailed in FIG. 3. The DC-DC converter 300 receives a high voltage DC 302, which may have high ripple particularly when the AC-DC converter is operated from high voltage AC in high voltage mode. High voltage DC 302 provides high voltage to a power-supply referenced power supply 304 which has a filter capacitor 306 coupled between an output 307 of the power-supply referenced power supply and high voltage DC 302; high voltage DC 302 also supplies a source of a P-channel switching transistor 308. A gate of P-channel switching transistor 308 is driven by P-switch driver 310, where P-switch driver 310 is powered by supply referenced power supply 304 output 307. A difference between power supply referenced power supply 304 output 307 and high voltage DC 302 remains essentially constant despite 120 Hz ripple on high voltage DC 302, thereby allowing adequate drive to P-channel switching transistor 308.

A small internal ground-referenced power supply 312 is also provided in the DC-DC converter. In a particular embodiment, ground referenced power supply 312 is coupled to receive power through power-supply referenced power supply 304, in alternative embodiments it may receive power directly from high voltage DC 302. Ground referenced power supply 312 provides power to a reference (not shown), a pulse-width modulator 316, and to an error amplifier 314. Error amplifier 314 compares DC-DC converter output voltage 318 to a reference, error amplifier 314 provides a control signal to the pulse-width modulator 316 such that pulse width modulator 316 then pulses P-type switching transistor 308 ON through level-shifter 320 and P-switch driver 310 with pulsewidth increasing as output voltage 318 droops with increasing output current demand. Level-shifter 320 is configured to transform a low voltage CMOS digital signal switching between internal ground and an output of ground-reference power supply 312 into a CMOS digital signal switching between high voltage DC 302 and an output of supply-referenced power supply 304. In order to reduce standby currents, in some embodiments supply-referenced power supply 304 is coupled such that one of its negative power input connections doubles as a positive power connection of ground referenced power supply 312—for an example, in an embodiment where both supplies are Zener-stabilized, current flows through both Zener diodes and a high-value resistor in series. P-type switching transistor 308 provides pulses to inductor 322 and diode 324 in a manner similar to that of a buck-type converter. An output filter 326, incorporating at least one energy-storage capacitor, is provided to remove ripple from DC-DC converter output 318.

In some embodiments, in order to provide optimum voltage regulation and stability, error amplifier 314 incorporates a proportional integrator differentiator (PID) as known in the art of buck-type DC-DC voltage regulators and voltage converters.

The power-supply referenced supply 304 and capacitor 306 together provide a voltage 307 that tracks with ripple of the high-voltage DC 302, in a particular embodiment voltage 307 remains approximately 12 volts below high-voltage DC 302 even if high-voltage DC 302 has 40 volts of ripple; this permits operation with gate oxides of high voltage P-switch 308 that may be rated to break down at gate-source voltage of 30 volts or less.

In a particular embodiment, the converter herein described is adapted to provide 5 volts DC for charging cell phones and tablet computers. In an alternative embodiment, the converter herein described is adapted to provide 18 volts DC for charging laptop computers.

While the invention has been particularly shown and described with reference to a preferred embodiment thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. An alternating-current (AC) to direct current (DC) power adapter comprising a rectifier providing an internal ground and a high voltage DC, the high voltage DC coupled to drive a DC-DC converter, and a high voltage filter coupled to filter the high voltage DC, the high-voltage filter comprising:
    a first capacitor coupled between the high-voltage DC and an intermediate node;
    a second capacitor coupled between the intermediate node and the internal ground;
    a source follower transistor having a drain coupled to the high-voltage and a source coupled to the intermediate node; and
    a reference supply coupled to provide a voltage to a gate of the source follower transistor;
    wherein the reference supply further comprises a speedup capacitor coupled to the gate of the source follower transistor and the high voltage DC;
    wherein the reference supply of the high voltage filter comprises a resistor coupled between the high-voltage DC and the gate of the source follower transistor, and at least one Zener diode coupled between the gate of the source follower transistor and internal ground;
    wherein the first and second capacitors have substantially different values;
    wherein the power adapter is operable over a 105-125 voltage range and a 200-240 voltage range; and
    a P-type switching transistor is coupled to receive a high voltage DC from the high voltage filter, and
    a power-supply-referenced power supply coupled to provide power to a driving circuit of the P-type switching transistor.

2. An alternating-current (AC) to direct current (DC) power adapter comprising a rectifier providing an internal ground and a high voltage DC, the high voltage DC coupled to drive a DC-DC converter, and a high voltage filter coupled to filter the high voltage DC, the high-voltage filter comprising:
    a first capacitor coupled between the high-voltage DC and an intermediate node;
    a second capacitor coupled between the intermediate node and the internal ground;
    a source follower transistor having a drain coupled to the high-voltage and a source coupled to the intermediate node; and
    a reference supply coupled to provide a voltage to a gate of the source follower transistor;
    wherein the reference supply further comprises a speedup capacitor coupled to the gate of the source follower transistor and the high voltage DC;
    wherein the reference supply of the high voltage filter comprises a resistor coupled between the high-voltage DC and the gate of the source follower transistor, and at least one Zener diode coupled between the gate of the source follower transistor and internal ground; and
    wherein the at least one Zener diode coupled between the gate of the source follower transistor and internal ground comprises a first Zener diode coupled between the gate of the source follower transistor and a reference supply node coupled to control the DC-DC converter, and a second Zener diode coupled between the reference supply node and internal ground.

3. A method of converting alternating current (AC) to an output regulated direct current (DC) comprising:
    rectifying the AC to provide a high voltage DC and an internal ground;
    using a source follower to derive an intermediate voltage from the high voltage DC, a gate of the source follower being coupled to a reference supply;

filtering the high voltage DC using at least a first capacitor coupled between the high voltage DC and the intermediate voltage, and a second capacitor coupled between the intermediate voltage and the internal ground; and providing the high voltage DC to a regulated DC-DC converter coupled to provide the output regulated DC;

wherein the reference supply comprises a resistor coupled between the high-voltage DC and the gate of the source follower transistor, and at least one Zener diode coupled between the gate of the source follower transistor and the internal ground;

wherein the DC-DC converter further comprises:

a P-type switching transistor coupled to receive a high voltage DC from the high voltage filter, and a power-supply-referenced power supply coupled to provide power to a driving circuit of the P-type switching transistor.

4. A method of converting alternating current (AC) to an output regulated direct current (DC) comprising:

rectifying the AC to provide a high voltage DC and an internal ground;

using a source follower to derive an intermediate voltage from the high voltage DC, a gate of the source follower being coupled to a reference supply;

filtering the high voltage DC using at least a first capacitor coupled between the high voltage DC and the intermediate voltage, and a second capacitor coupled between the intermediate voltage and the internal ground; and providing the high voltage DC to a regulated DC-DC converter coupled to provide the output regulated DC;

Wherein the reference supply comprises a resistor coupled between the high-voltage DC and the gate of the source follower transistor, and at least one Zener diode coupled between the gate of the source follower transistor and the internal ground;

wherein the reference supply further comprises a speedup capacitor coupled to boost voltage at the gate of the source follower upon rapid rise in the high voltage DC.

\* \* \* \* \*